United States Patent [19]
Watson

[11] 3,732,676
[45] May 15, 1973

[54] GROUND ENGAGING SICKLE BAR SPACER

[76] Inventor: Joseph P. Watson, Rt. 1, Box 43A, Elizabethtown, N.C. 28337

[22] Filed: Jan. 28, 1972

[21] Appl. No.: 221,539

[52] U.S. Cl. .................................................56/313
[51] Int. Cl. .............................................A01d 55/10
[58] Field of Search ....................56/296, 307–313, 56/318

[56] References Cited

UNITED STATES PATENTS

| | | | |
|---|---|---|---|
| 1,258,740 | 3/1918 | Blocki | 56/313 |
| 2,187,438 | 1/1940 | Wilcox | 56/313 |
| 1,048,731 | 12/1912 | Pinckert | 56/313 |
| 863,883 | 8/1907 | Sattler | 56/313 |
| 752,367 | 2/1904 | Titamore | 56/313 |

FOREIGN PATENTS OR APPLICATIONS

| | | | |
|---|---|---|---|
| 120,188 | 10/1927 | Switzerland | 56/318 |

Primary Examiner—Antonio F. Guida
Assistant Examiner—J. A. Oliff
Attorney—Harvey B. Jacobson

[57] ABSTRACT

A readily attachable skid for a sickle bar and attachable to the latter with little effort generally centrally intermediate the opposite ends of the sickle bar. The skid or runner is dependingly supported from the corresponding sickle bar and functions to maintain the central portion of the sickle bar at an elevation of at least three inches above the ground surface over which the lower portion of the skid or runner is moving. The skid is of a structure so as to be non-yielding and thereby eliminates sway and sag of the associated sickle bar and insures that the sickle bar will not have any of its cutting portions engaged with the ground due to slight irregularity in the ground surface or sag of the sickle bar.

2 Claims, 3 Drawing Figures

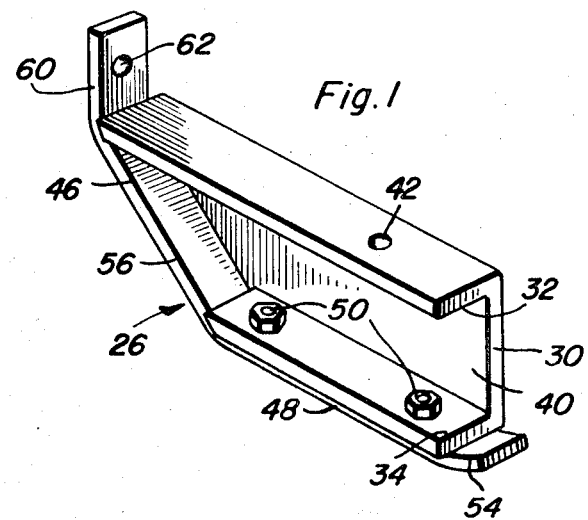
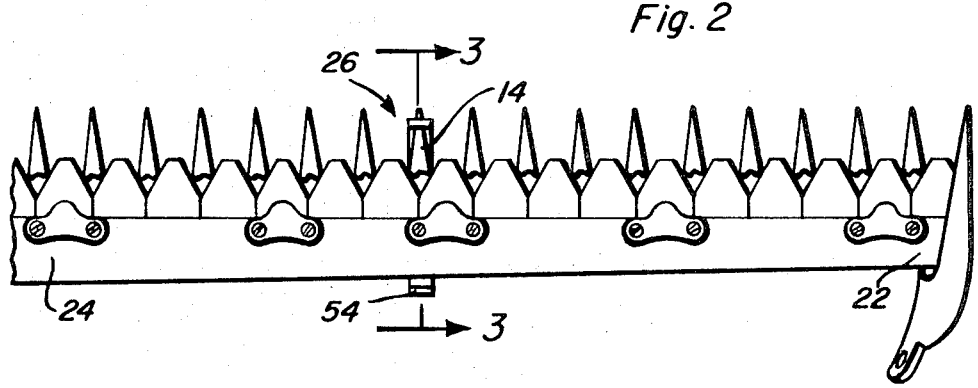
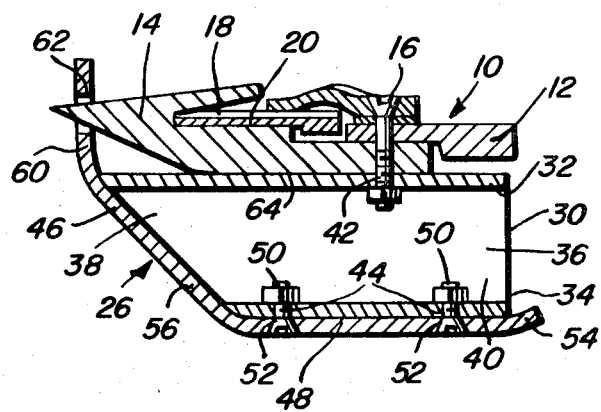

GROUND ENGAGING SICKLE BAR SPACER

The skid of the instant invention pertains to an attachment for mowing machines of various makes and models provided with a sickle bar and when attached to the latter comprises an integral part thereof. Conventional cutter bars are provided with "clodknockers" on their free ends, but these attachments tend to clog with foreign objects and the operator of the associated cutter or sickle bar must occasionally interrupt his mowing operation in order to remove accumulated foreign matter picked up by the "clodknocker". The skid attachment of the instant invention, by being mounted on the midportion of an associated sickle bar eliminates the need for a "clodknocker".

In addition to eliminating sag and sway of the associated sickle bar, the attachment of the instant invention further functions to reduce sag-sway friction and by angling a cutter bar provided with the skid of the instant invention a smooth cut can be obtained in the bottom of ditches. Further, the skid of the instant invention can be aligned with the center of a ditch thereby obtaining a smooth close cut on both sides of a ditch and close trimming along curbs can be obtained by placing the skid immediately adjacent the curb.

The main object of this invention is to provide an attachment for a sickle bar that will enable exact cutting heighth to be maintained on substantially all types of terrain, even where the ground is uneven.

Another object of this invention is to provide a skid in accordance with the preceding object constructed in a manner enabling it to be readily attached to various makes of sickle bars in a minimum of time and with the utilization of only simple hand tools.

Yet, another object of this invention is to provide a runner attachment for a sickle bar that will not have a tendency to clog and which will therefore eliminate the need for intermittent interruption of the mowing operation in order to remove clogged foreign material from the associated cutter bar.

A final object of this invention to be specifically enumerated herein is to provide a sickle bar skid in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the ground engaging sickle bar spacing skid of the instant invention;

FIG. 2 is a fragmentary top plan view of the conventional form of a sickle bar with the ground engaging sickle bar spacing skid of the instant invention mounted thereon;

FIG. 3 is an enlarged transverse sectional view taken substantially upon the plane indicated by the sectional line 3—3 of FIG. 2.

Referring now more specifically to the drawings, the numeral 10 generally designates a conventional form of sickle bar including a main longitudinal support bar 12 having longitudinally spaced and laterally directed finger guards 14 secured thereto at a point spaced longitudinally therealong by means of suitable threaded bolts.

The conventional sickle bar 10 further includes coacting stationary and reciprocal cutting teeth 18 and 20.

The sickle bar 10 includes an outer free end 22 and a base end portion 24. The ground engaging sickle bar spacing skid of the instant invention is referred to in general by the reference numeral 26 and is secured to a finger guard 14 generally centrally intermediate the opposite ends of the sickle bar 10. The skid 26 comprises an elongated C-shaped channel member 30 including upper and lower horizontal longitudinal flanges 32 and 34 interconnected along corresponding longitudinal edge portions by means of an upstanding web 36. The channel member 30 includes a forward end 38 cut along a rearwardly and downwardly inclined bias line and a rear end 40.

The upper flange 32 has a single aperture 42 formed therethrough and the lower flange 34 has a pair of longitudinally spaced apertures 44 formed therethrough.

A flat runner bar 46 is provided and includes a generally horizontal rear end portion 48 underlying and secured to the under side of the lower flange 34 by means of threaded fasteners 50 secured through the apertures 44 and corresponding countersink apertures 52 formed in the rear end portion 48. The rear end portion 48 includes a terminal end which projects rearwardly of the channel member 30 and is curved slightly upwardly as at 54. The forward end 56 of the runner bar 46 is inclined upwardly and secured to the inclined forward face or edge of the channel member 30 in any convenient manner such as by welding. The forward end portion 56 includes an angulated vertical extension 60 which extends upwardly above the upper flange 32 and is apertured as at 62.

The under surface of the finger guard 14 is generally flat as at 64 and in order to secure the skid 26 to the sickle bar 10 the bolt 16 is first removed and thereafter also secured through the aperture 42 in the upper flange 32 after the skid 26 has been positioned so that the forward extremity of the finger guard 14 projects through the aperture 62 in the extension 60. In this manner, a single fastener or bolt 16 may be utilized to secure the skid 26 to the sickle bar 10 with there being no possibility of the skid 26 being angularly displaced about the center axis of the bolt 16.

The vertical height of the channel member 30 is 3 inches and the flat runner bar 46 is one-quarter inch thick and 1¼ inch wide so as to provide a sturdy runner surface.

The forwardly and upwardly inclined forward end 56 of the runner bar 46 functions to allow the skid 26 to ride up over ground obstructions and out of sharp depressions into which the skid 26 may drop during forward movement of the sickle bar 10.

It will be noted that while the runner bar 46 is readily replaceable, only a single pair of fasteners 50 are utilized to secure the runner bar 46 to the channel member 30 and a single bolt 16 is utilized to secure the to the member 30 the finger guard 14. Although only three fasteners are utilized, angular displacement of the channel member 30 relative to the finger guard 14 is prevented and angular displacement of the runner bar 46 relative to the channel member 30 is prevented. Further, inasmuch as the single fastener or bolt 16 is utilized to secure the entire skid or attachment 26 to the sickle bar 10, the skid 26 may be readily removed or attached to the sickle bar 10 in a very short time, approximately 1 minute.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated sickle bar of the type including longitudinally spaced and laterally forwardly directed elongated finger guards each tapering toward their forward ends and secured at their rear ends to said bar by means of an upstanding attaching fastener removably secured through said bar and said finger guard, a guard engaging spacer skid attachment including a horizontally elongated body comprising an elongated C-shaped channel member having front and rear ends and including upper and lower horizontal longitudinal flanges interconnected along corresponding side marginal edges by means of an upstanding integral web extending therebetween, the front end of said channel member terminating along a transverse forwardly and upwardly inclined plane, an elongated strap-type runner bar underlying, extending along and secured to said lower flange, the forward end of said bar being inclined upwardly along said plane and including a forward terminal end directed generally vertically upwardly in front of the forward end of said upper flange and terminating upwardly at a point spaced above said upper flange, the portion of said terminal end projecting above said upper flange having an aperture formed therethrough, said body underlying one of said finger guards with the forward end of said one guard removably received in said aperture and the underside of said guard resting upon the upper surface of said upper flange, said attaching fastener also being secured through said upper flange, the rear end of said strap-type runner bar projecting at least slightly rearward of the rear end of said channel member and being at least slightly upwardly curved.

2. The combination of claim 1 wherein the forward and upwardly inclined forward end of said runner bar is abutted against and rigidly secured to the forwardly and upwardly inclined portion of said channel member by welding.

* * * * *